Sheet 2.

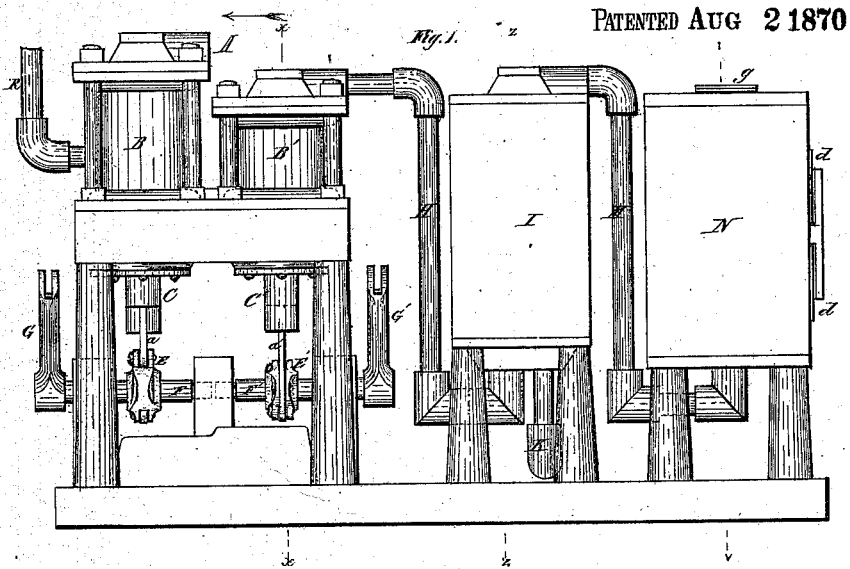
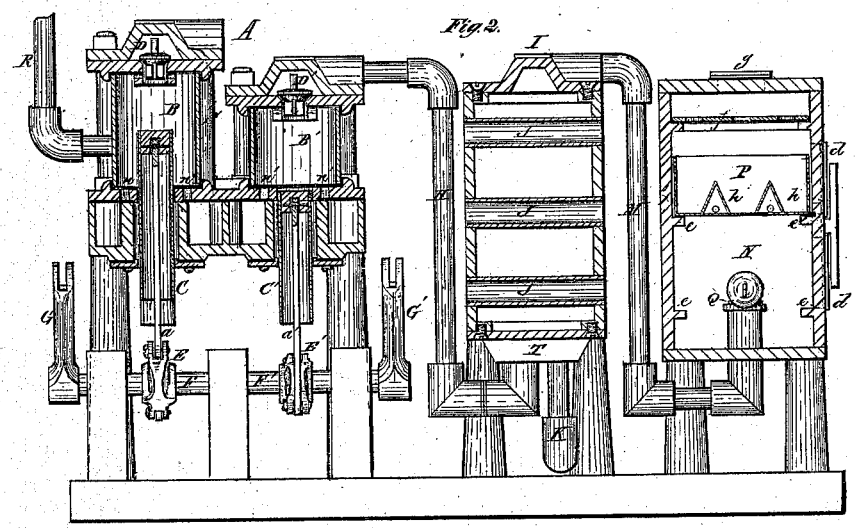

Wm. T. Duvall. Imp⁴ App⁴⁵ for the Manufacture of Ice.

Witnesses:
W. Norris Smith
Harvey C. Smith

Inventor:
W. T. Duvall

Sheet 3.

Wm. T. Duvall. — Imp'd App'ts for the Manufacture of Ice.

Witnesses:                                  Inventor:

UNITED STATES PATENT OFFICE.

WILLIAM T. DUVALL, OF GEORGETOWN, DISTRICT OF COLUMBIA.

IMPROVEMENT IN MACHINERY FOR THE MANUFACTURE OF ICE.

Specification forming part of Letters Patent No. 105,924, dated August 2, 1870.

*To all whom it may concern:*

Be it known that I, WM. T. DUVALL, of Georgetown, in Washington county and District of Columbia, have invented certain new and useful Improvements in Machinery for Manufacturing Ice; and I do hereby declare that the following is a full, clear, and exact description thereof, reference being had to the accompanying drawings, through letters of reference marked thereon, forming part of this specification, and in which—

Figure 3:
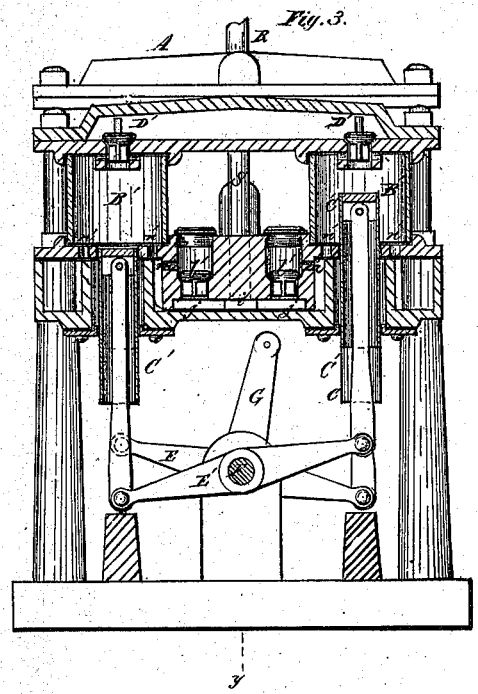
Figure 4:
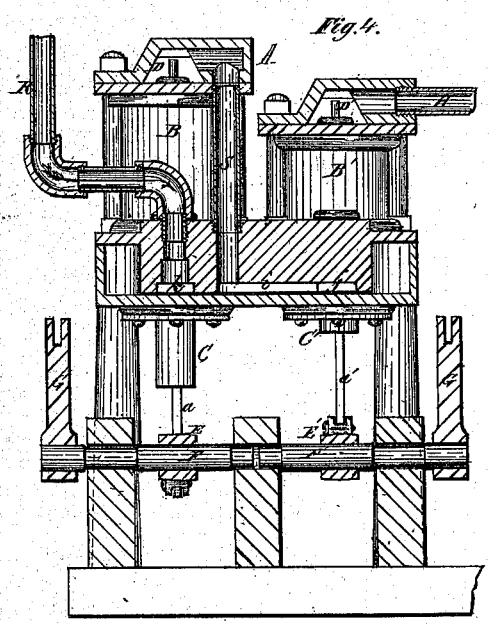
Figure 5:
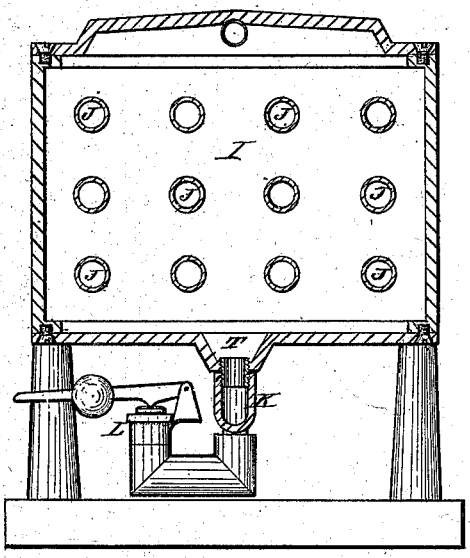
Figure 6:
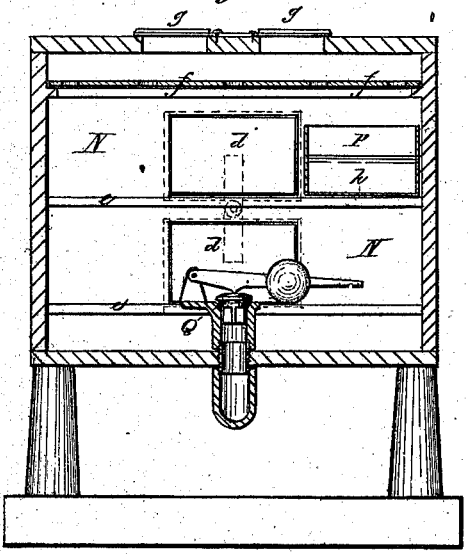

Figure 1 is a side elevation of my apparatus complete. Fig. 2 is a vertical longitudinal section. Fig. 3 is a vertical transverse section, taken as indicated by the line $x\,x$ on Fig. 1, looking in direction of the arrow on said figure. Fig. 4 is a vertical longitudinal section through the compressing portion of my apparatus, taken as indicated by the line $y\,y$ on Fig. 3. Fig. 5 is a vertical transverse section of the radiator, taken as indicated by the line $z\,z$ on Fig. 1. Fig. 6 is a vertical transverse section of the freezing-chamber, taken as indicated by the line $v\,v$ on Fig. 1.

The same letters occurring on the several figures indicate like parts throughout.

My invention relates to that class of machinery in which intensity of cold is produced by the successive compression, refrigeration, and expansion of atmospheric air, in which class of machinery much difficulty has been experienced in compressing all the air received within the compression-chambers—or, in other words, in preventing leakage of the compressed air—whereby a great loss of the freezing-agent is sustained after considerable power had been expended upon it.

To prevent this loss and waste of power is the main object of my invention, which consists in so arranging the valves and plungers of the compression-chambers that they may be at all times water-sealed, whereby, if leakage does occur, it is that of water, and not of compressed air, the water used for this purpose also serving to absorb much of the heat generated by the compressing of the air, and thus preparing the latter for expansion.

Another feature of my invention consists in the application to the radiator and to the freezing-chamber of automatic pressure, waste, and gage valves, for the purpose of discharging from said vessels the water or surplus thereof that has been carried over with the air, and at the same time retaining sufficient thereof to prevent the escape of the air.

The invention also embraces other peculiarities of construction, which will be more minutely described hereinafter.

Referring to the drawings, A represents the compressing apparatus, consisting of two pairs of cylinders, B B', having plungers C C' and valves D D'. These plungers are caused to reciprocate alternately by their pitmen $a\,a'$, connected with the rocking beams E E' on independent rock-shafts F F' by any suitable power applied to the levers G G', the operation of which will be more fully described hereinafter. This compressing apparatus is connected with the radiator or condenser I by a pipe, H, passing from the chamber of the valves D' at the upper end of the pair of cylinders B', and down under and into the bottom of said condenser, which, as represented, consists of a rectangular chamber having a series of pipes or air-flues, J, passing through, so as to afford a large amount of radiating-surface. This condenser is furthermore provided with a siphon-pipe, K, and valve L, by which the escape may be regulated. The pipe M forms a passage for the air from the upper part of the condenser I into the lower part of the freezing-chamber N, after all the heat produced by its compression has radiated from it. At the end of this the air is restrained by a weighted valve, Q, through which it passes, only at a given pressure, into the freezing-chamber N, where it expands and absorbs the heat from the water in the pans P, which are arranged upon ledges $e$ on the inner sides of said chamber, and which pans are removable at pleasure by opening the doors $d$ in the side. A perforated diaphragm or false top, $f$, is inserted in the upper part of the chamber N, which causes the air to be diffused through the entire space, and checks its too rapid escape through the exit-valves $g$ while the water in the pans P is being frozen. This diaphragm $f$ may be dispensed with by substituting for the large valves $g$ a series of smaller ones distributed over the entire top of the cramber N, so as to diffuse the air in said chambers. These pans I prefer to form with corrugated or upward $\wedge$-shaped projections $h$ across their bottoms, both to increase the surface to be acted on and to facilitate the removal of the blocks when frozen.

The operation of the machine will then be as follows: The plungers C C' being caused to reciprocate in their respective cylinders by motion communicated through the rock-shafts F, levers E, and pitmen $a$ $a'$, and air being supplied to the cylinders B through the ingress-pipe R, which also receives a small continuous supply of water in any convenient manner, they (the air and water) flow together in direction of the arrow on Fig. 4, into and through the passage $k$ communicating with the valves $l$, which alternately open and allow such aerated fluid to pass through apertures $m$ and an annular series of orifices, $n$, in the bottom of the cylinders B B, into said cylinders alternately, in accordance with the direction in which the pistons of the respective cylinders are moving.

In practical operation it is intended that the supply of water introduced with the air shall be a fraction more than sufficient to keep the said cylinders full when the pistons are at their highest point, so that there may be surplus water at each stroke of the piston after the air has been expelled from said cylinder to pass the valve D and keep it water-sealed. Thus, in the continuous reciprocations of the pistons, a volume of air equal to the area of the projection of the piston will be forced through the valve D and conveyed from its chamber through the pipe S, into the channel $i$, which communicates, through the passage $j$, with the valves $l$, and they, respectively, with the cylinders B' B', through apertures $m'$ and annular series of orifices $n'$ in the bottom of said cylinders, the pistons of which operate on the air, previously compressed in the cylinders B, to still further increase its temperature in the same manner, it being always understood that sufficient quantity of water is supplied with the air, through the ingress-pipe R, to keep each of the cylinders B B' full when its respective plunger is at its greatest elevation, and a surplus to flow through to water-seal the upper valves, D D'. From the chamber of the valves D' the air and surplus water are forced through the pipe H, which is connected with a pan or pocket, T, formed in the bottom of the radiator I, into said radiator, which may be constructed, as represented, with a series of flues, J, passing through it, or in any other manner to obtain the largest amount of exterior radiating surface. From the upper part of this radiator I the compressed air, which has radiated a large portion of the heat produced by its compression, is conducted through the pipe M into the lower portion of the freezing-chamber N. The mouth or discharge-orifice of the pipe M, however, is provided with a valve, Q, controlled by a weighted lever, to prevent the passage of the air below a certain required pressure.

The air, which has previously been heated by compression in the compressing apparatus A, and while under compression in the chamber I, having radiated such accumulated heat, is allowed to expand, and thereby further reduce its temperature in the freezing-chamber N, where a number of the vessels or pans, P, filled with water, are arranged. The air thus reduced in temperature absorbs the caloric of the water, which at once congeals, forming ice.

It is obvious that the radiator or condenser I would become filled with water instead of air if there was no provision for the escape or discharge of the former except through the pipe M into the freezing-chamber N. I therefore provide a siphon-pipe, K, closed at its lower extremity by a weighted valve, L, and arranged at the bottom of said radiator, to receive and pass off the water thrown over with the air into this chamber. The discharge of said pipe M is also controlled by a weighted valve, Q, at or near the bottom of the refrigerator. These valves being both weighted and subject to the same amount of pressure from the compressed air in the radiator I, and having two distinct functions to perform—that is to say, the one Q to allow the passage of the air from the radiator when it obtains a given pressure, and the one L to remain closed under the same pressure, but yet be capable of opening automatically whenever an accumulation of water obtains in said radiator. To accomplish this object I extend the siphon K downward, say, nine feet, so that the two valves shall vary that amount in their respective levels or elevations, said valves being of the same area. If the valve Q in the refrigerator should be found to require a weight of one hundred and forty pounds (140 lbs.) to retain it in position against the elastic force of the air, the other would require the same, provided there was no water in the siphon or the radiator; but suppose the siphon to be filled with water drained from the radiator to the height of nine feet above the level of its valve, then the valve L would require to be weighted to one hundred and forty-four pounds (144 lbs.) to retain it in its position, owing to the weight of the column of water in the siphon. It is obvious, therefore, that if the column of water in the siphon exceeds in weight the difference between the loads on the two valves, the valve L will open and allow the excess of water to pass off, while the valve Q is either closed or passing air at the desired pressure into the refrigerator.

The air admitted through the valve Q into the refrigerator having performed its function in absorbing the heat from the water in the pans P is allowed to escape through the valve or valves $g$. These valves are loaded just sufficient to keep them closed when the internal and external pressure are equal, or nearly so, to prevent the ingress of air at the ordinary atmospheric temperature into the refrigerator.

Having thus described my invention, what I desire to secure by Letters Patent is—

1. The arrangement of a pump or pumps with relation to their supply and discharge apertures in such manner that both air and water may be admitted and all the air ejected, while a sufficient portion of the water will be retained within the several compartments to water-seal all the valves and joints, substantially in the manner specified.

2. In an air-compressing apparatus, the introduction of water with the air for the absorption of a portion of the caloric produced by such compression, and to prevent heating of the apparatus, substantially as set forth.

3. The method herein described of discharging the water from the radiator by means essentially as set forth.

4. In combination with the compressing apparatus, operating as described, the radiator I and refrigerator N, and their respective ingress and egress pipes and valves, arranged and operating substantially as specified.

5. The arrangement of a perforated diaphragm, or its equivalent, in or near the top of the refrigerator, substantially as and for the purpose specified.

6. The construction of the pans P, with V-shaped corrugations across their bottoms, or with conical or similar projections upwardly within them, substantially as shown and described, for the purpose set forth.

WM. T. DUVALL.

Witnesses:
SYDNEY E. SMITH,
W. MORRIS SMITH.